No. 867,052.  
PATENTED SEPT. 24, 1907.

C. KÖTTGEN & G. MEYER.  
TOWING LOCOMOTIVE.  
APPLICATION FILED MAR. 12, 1906.

Witnesses:  
Theodore R. Knight.  
Wm. P. Hammond

Inventors:  
Carl Köttgen  
Georg Meyer  
By Knight Bros.  
their attorneys.

UNITED STATES PATENT OFFICE.

CARL KÖTTGEN, OF SCHÖNEBERG, AND GEORG MEYER, OF BERLIN, GERMANY, ASSIGNORS TO SIEMENS-SCHUCKERT WERKE, G. M. B. H., OF BERLIN, GERMANY, A CORPORATION OF GERMANY.

TOWING-LOCOMOTIVE.

No. 867,052.    Specification of Letters Patent.    Patented Sept. 24, 1907.

Application filed March 12, 1906. Serial No. 305,604.

*To all whom it may concern:*

Be it known that we, CARL KÖTTGEN, engineer, of Schöneberg, near Berlin, Germany, and GEORG MEYER, engineer, of Berlin, Germany, both subjects of the German Emperor, have invented a certain new and useful Improvement in Towing-Locomotives, of which the following is a specification.

The present invention relates to towing locomotives, and has for its object to provide a locomotive in which the component parts are best arranged to produce the maximum working capacity.

Figure 1:
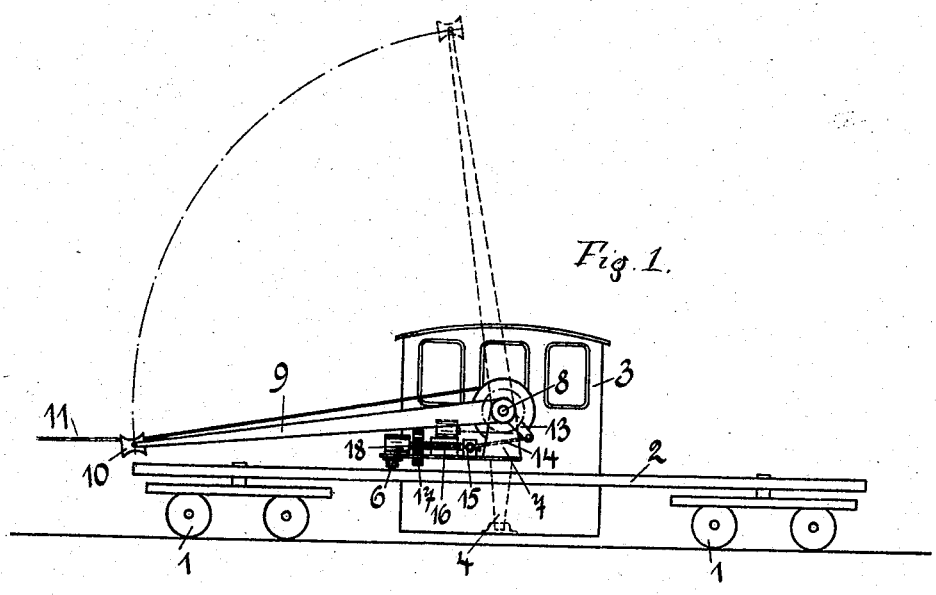
Figure 2:
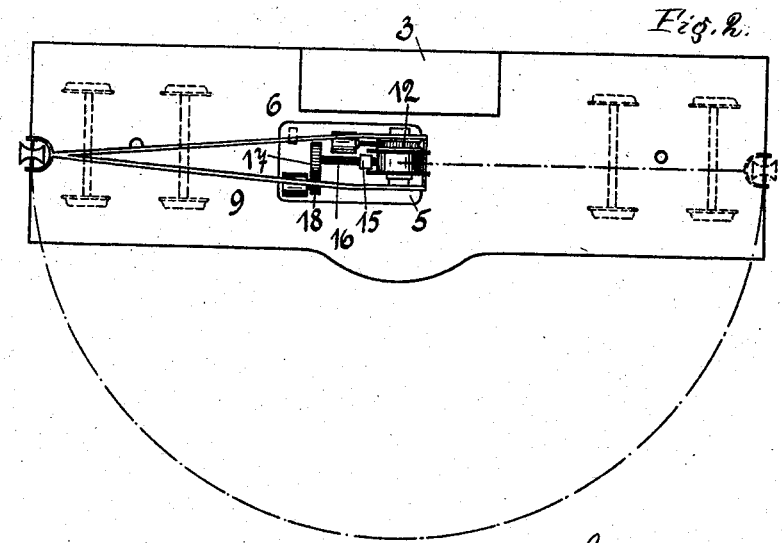

A locomotive constructed in accordance with the present invention is so arranged that it is symmetrical in side elevation, while in end elevation it is non-symmetrical. The locomotive is so designed as to give to the tow-line guide a play of approximately 180°, the cab of the locomotive being mounted in such a position that it does not interfere with the play of the guide. The cab at the same time forms a counterbalance for the tow line guide, and the strain exerted thereon, and serves to make the locomotive more capable. More specifically stated, a locomotive constructed in accordance with the present invention has its towline guide and its cab mounted in two parallel planes arranged to each side of the longitudinal axis of the locomotive. Such a locomotive is described in the following specification and clearly illustrated in the accompanying drawing, in which like reference characters refer to like parts, and in which Figure 1 is a side elevation of a towing locomotive constructed in accordance with the present invention. Fig. 2 is a plan view of the same.

Referring now in detail to the drawings, 1 represents the locomotive trucks, 2 the platform having mounted thereon a cab 3 mounted to one side of the platform 2. 4 is a suitable pivot which is journaled in the platform 2 and upon which is mounted a suitable platform 5 supported at its outer end by rollers 6. Platform 5 has mounted thereon standards 7 in which is journaled a horizontal shaft 8, upon which is mounted the tow-line guide support 9 pivotally carrying at its outer end a tubular tow-line guide 10 through which the tow-line 11 passes to a winding drum 12 mounted on the shaft 8. Shaft 8 has rigidly mounted thereon an arm 13 through means of which the shaft 8 is operated to change the vertical angle support 9. An arm 13 is operated by a link 14 pivoted to a traveling block 15, which slides along the platform 5 and is operated by a screw 16, having mounted thereon a gear wheel 17 engaged by a gear 18, operated in any suitable manner, and controlled in its operation from the cab 3. The platform 5 is rotatably mounted upon the pivot 4 and such rotation is produced in any suitable manner, and preferably controlled from the cab.

The tow-line guide support 9 may be either rotatable about a vertical axis and about a horizontal axis. or the same may consist of a rotary funnel or similar device adjustable in the manner of a telescope, lazy-tong, or the like. The elevation of the engaging point of the tow-line 11 with the guide 10 is changed by turning support 9 on the shaft 8, while the angle between the support 9 and the longitudinal axis of the locomotive is changed by the rotation of the pivot 4. The arrangement herein is such that the tow-line can be elevated to a height above the shaft 8 equal to the length of the support 9, or the same can be lowered to a point immediately above the locomotive truck wheels, thus giving a maximum extent of vertical adjustment and while in any position the support 9 may describe, or approximately describe, a complete semicircle on one side of the longitudinal center of the locomotive.

By the arrangement herein described the engineer's cab is entirely removed from the path of movement of the support 9 and the locomotive is so positioned on the track that the cab will always be on the land side thereof. The arrangement herein described permits of the locomotive being effectively run in either direction. The cab may be placed at either end of the locomotive instead of in the center but it is desirable that if the same is placed at one end of the locomotive another cab or a counterweight be placed at the opposite end to equalize the same. As shown in the drawings, the arrangement of the cab beside the tow-line guide support 9 guards against lateral motion or tilting of the locomotive. In use of the locomotive, it is preferable that the tow-line guide support 9 be allowed to automatically adjust itself on its vertical axis so as to compensate for the various changes in angle between the towing locomotive and the object towed. The change in elevation of the tow-line guide 10 is preferably kept under the control of the operator in the cab 3.

Having thus described my invention, the following is what I claim as new therein and desire to secure by Letters Patent:

1. In a towing mechanism, the combination of a platform, of a tow line guide thereon having a horizontal pivotal movement approximately equal to 180° and a cab containing the controlling device for said guide mounted on said platform out of the path of said tow line guide.

2. In a towing locomotive, the combination with a platform, of a tow-line guide and a cab containing the controlling device for said guide, said cab and said guide being disposed side by side transverse to the running direction of the locomotive.

3. In a towing locomotive, the combination of a platform, a tow-line guide and a cab, containing the controlling device for said guide disposed on the platform side by side transverse to the running direction of the locomotive and having the guide substantially in the middle of the platform and the cab on the side of the platform.

4. In a towing locomotive the combination of a platform, a tow-line guide adapted to have vertical and horizontal adjustment and a cab containing the controlling device for said guide, said cab and said guide being mounted side by side transverse to the running direction of the locomotive, the guide being substantially in the middle of the platform and the cab on the side of the platform opposite the tow.

5. A towing locomotive, comprising a platform, a tow-line guide capable of unobstructed movement over that portion of the platform on one side of the longitudinal center of the platform, and means on the other side of the longitudinal center of the platform for controlling the movement of said guide.

CARL KÖTTGEN.
GEORG MEYER.

Witnesses:
WOLDEMAR HAUPT,
HENRY HASPER.